Patented Apr. 8, 1952

2,591,664

UNITED STATES PATENT OFFICE 2,591,664

PURIFICATION PROCESS

Joseph J. Wehrle, Altoona, Pa., and Oliver L. Niehouse and Jerome G. Burtle, Alton, Ill., assignors to Olin Industries, Inc., East Alton, Ill., a corporation of Delaware No Drawing. Application February 23, 1946, Serial No. 649,738

4 Claims. (Cl. 23—312)

This invention relates to the manufacture of alkali metal azides and more particularly to purification of such azides employing liquid ammonia.

Various methods have been employed in the past for the manufacture of alkali metal azides. Several of these, especially those involving high temperature reactions between an alkali metal amide and nitrous oxide, produce an azide which contains sodium hydroxide and frequently is very low in purity and often highly colored. Processes heretofore described for purification of alkali metal azides containing metal hydroxides, have involved procedures in which the solid products obtained in the preparation of the alkali metal azides are taken up in water and the metallic azide subsequently separated by recrystallization or precipitation from the water solution. On such products of very low purity, the conventional water purification procedures are not as efficient or effective as they are on reaction products containing smaller amounts of impurities.

An object of this invention is to provide a novel and simple procedure for raising the purity of highly contaminated alkali azides. A further object is to provide a simplified procedure for purifying crude alkali metal azides at low cost. Another object is to provide an improved economical process for removing colored impurities from alkali metal azides. Other objects and advantages will become apparent as the invention is described more at length hereinafter.

The foregoing objects are accomplished in accordance with this invention by removing the azide from its impurities by solution in anhydrous liquid ammonia. It has been found that when the impure reaction mixture from the preparation of alkali azides is subjected to the action of anhydrous liquid ammonia at temperatures near the boiling point of the ammonia under atmospheric pressure, the azide is dissolved, whereas the majority of the impurities, including substantially all the coloring matter, remains undissolved and can be readily separated from the solution. The purified azide is then recovered from the solution, which can be readily accomplished by volatilizing the solvent ammonia.

While this invention is applicable generally to alkali metal azides, its use will be described in detail with regard to the purification of sodium azide which is at present the most important of the alkali metal azides from a commercial standpoint.

In one embodiment of this invention, the impure reaction product obtained in the preparation of sodium azide is placed on a filter of fine porosity. Anhydrous liquid ammonia at a temperature near the boiling point of ammonia at atmospheric pressure is passed through the product on the filter until all soluble matter has been dissolved, which is indicated when the volume of material left on the filter remains constant. The ammonia is then volatilized from the filtrate and the solute is sodium azide of substantially improved purity. In carrying out the process it is preferred from an economical standpoint to re-use a portion of the ammonia from the filtrate in extracting the material on the filter. For instance, the filtrate may be caused to boil and the resulting volatilized ammonia may be again liquefied by refrigeration or compression and continuously passed through the reaction products on the filter, thereby effecting a continuous extraction of sodium azide from the reaction products by means of a relatively small volume of liquid ammonia. Likewise, the ammonia, evaporated from the filtrate in order to separate the sodium azide therefrom, may be recovered in a liquid state by refrigeration or compression so that the ammonia may be used in subsequent purifications. The sodium azide obtained from the filtrate is then allowed to come to room temperature in the absence of moisture.

The following table presents the results of this invention as applied to the purification of sodium azides having varying contents of impurities and prepared by the reaction of sodium amide and nitrous oxide in mineral oil at a temperature of about 185° C.

| Impure Reaction Product | | Purity After Treatment | |
|---|---|---|---|
| Per Cent $NaN_3$ | Color | Per Cent $NaN_3$ | Color |
| 24.0 | Very dark brown. | 97.5 | White. |
| 72.2 | Dark brown. | 97.1 | Do. |
| 73.0 | Gray. | 96.7 | Do. |
| 83.5 | Light brown. | 95.5 | Do. |
| 90.5 | Light gray. | 98.1 | Do. |
| 91.8 | Gray. | 96.2 | Do. |
| 97.3 | White. | 99.5 | Do. |

As shown above, the coloring matter is removed from the crude azide by the process of this invention and an azide is obtained having a substantially increased purity. This product of about 95% or greater purity may be employed as an intermediate in the preparation of heavy metal azides used in the explosives industry and may likewise be utilized in the production of high-purity reagent azides.

In the specific embodiment set forth above, an extraction process for the purification of sodium azide is described. It should be understood, however, that the process may be employed with other azides and that many modifications thereof can be made without departing from the spirit and scope of the invention and that the invention is to be limited only as set forth in the appended claims.

Having thus described the invention what is claimed and desired to secure by Letters Patent is:

1. In the manufacture of alkali metal azides wherein an alkali metal amide is reacted with nitrous oxide to produce a reaction product containing alkali metal azide contaminated with reaction by-products, the process of purification which comprises extracting the reaction product with anhydrous liquid ammonia, separating the extract from the undissolved reaction product, and thereafter removing the ammonia from the azide solute.

2. In the manufacture of alkali metal azides wherein an alkali metal amide is reacted with nitrous oxide to produce a reaction product containing alkali metal azide contaminated with reaction by-products, the process of purification which comprises extracting the impure reaction product with anhydrous liquid ammonia, filtering the resulting solution, and recovering the azide by evaporating the ammonia from the filtrate.

3. In the manufacture of alkali metal azides wherein an alkali metal amide is reacted with nitrous oxide to produce a reaction product containing alkali metal azide contaminated with reaction by-products, the process of purification which comprises continuously passing anhydrous liquid ammonia through a mass of the impure reaction products on a filter by continuously vaporizing and then liquefying some of the ammonia from the filtrate and passing said liquefied ammonia through said reaction products, terminating the flow of liquid ammonia through said reaction product when the soluble material therein has been dissolved, separating the purified azide from the filtrate by vaporizing the ammonia from the solution, and liquefying said vaporized ammonia for re-use.

4. In the manufacture of substantially pure alkali metal azides, the process which comprises reacting an alkali metal amide with nitrous oxide, subjecting the products resulting from said reaction to the action of anhydrous liquid ammonia at a temperature equal to substantially the boiling point of said ammonia at atmospheric pressure until all material soluble therein is dissolved, separating the resulting liquid ammonia solution from the insoluble material, and removing the substantially pure alkali metal azide from said solution by evaporating the ammonia.

JOSEPH J. WEHRLE.
OLIVER L. NIEHOUSE.
JEROME G. BURTLE.

REFERENCES CITED

The following references are of record in the file of this patent:

UNITED STATES PATENTS

| Number | Name | Date |
|---|---|---|
| 1,505,078 | Dolbear | Aug. 12, 1924 |
| 1,947,570 | Pranke | Feb. 20, 1934 |
| 2,029,623 | Kircher | Feb. 4, 1936 |
| 2,373,800 | Ackin et al. | Apr. 17, 1945 |

OTHER REFERENCES

Mellor Inorg. and Theo. Chem., vol. 8, pp. 276 and 347.